United States Patent
Dosa Racz et al.

(10) Patent No.: US 7,523,491 B2
(45) Date of Patent: Apr. 21, 2009

(54) SYSTEM, APPARATUS, AND METHOD FOR ACCESSING MOBILE SERVERS

(75) Inventors: Ferenc Dosa Racz, Helsinki (FI); Johan Wikman, Helsinki (FI); Teemu Jalava, Espoo (FI)

(73) Assignee: Nokia Corporation, Espoo (FI)

( * ) Notice: Subject to any disclaimer, the term of this patent is extended or adjusted under 35 U.S.C. 154(b) by 792 days.

(21) Appl. No.: 11/028,460

(22) Filed: Jan. 3, 2005

(65) Prior Publication Data
US 2008/0010676 A1    Jan. 10, 2008

(51) Int. Cl.
*G06F 9/00* (2006.01)
*G06F 17/00* (2006.01)

(52) U.S. Cl. ............ 726/11; 726/12; 713/152; 713/153; 713/154; 709/217; 709/223; 709/239

(58) Field of Classification Search .......... 726/11, 726/12; 707/100; 713/152–154; 709/217, 709/223, 239
See application file for complete search history.

(56) References Cited

U.S. PATENT DOCUMENTS

| | | | |
|---|---|---|---|
| 6,212,556 B1 | 4/2001 | Arunachalam | |
| 6,334,056 B1 * | 12/2001 | Holmes et al. | 455/445 |
| 6,519,568 B1 | 2/2003 | Harvey et al. | |
| 6,587,882 B1 | 7/2003 | Inoue et al. | |
| 6,647,001 B1 | 11/2003 | Bhagavath et al. | |
| 6,704,295 B1 | 3/2004 | Tari et al. | |
| 6,988,147 B2 * | 1/2006 | King | 709/239 |
| 2002/0023140 A1 * | 2/2002 | Hile et al. | 709/217 |
| 2003/0039237 A1 * | 2/2003 | Forslow | 370/352 |
| 2005/0004968 A1 | 1/2005 | Mononen et al. | |
| 2005/0015386 A1 * | 1/2005 | Mortensen et al. | 707/100 |

* cited by examiner

Primary Examiner—Kambiz Zand
Assistant Examiner—Kari L Schmidt
(74) Attorney, Agent, or Firm—Hollingsworth & Funk, LLC

(57) ABSTRACT

A mobile terminal operating within a firewall protected mobile domain provides mobile server functionality to requesting entities outside of the protected domain. Links to content contained within, or proximately coupled to, the mobile server are located via registry entries. Internet Protocol (IP) address queries associated with the firewall protected mobile server result in the return of the IP address of a socket gateway. The socket gateway acts as a trusted interface to both the mobile server's domain as well as the requesting entities' domain. The socket gateway intercedes as a relay to setup, maintain, and tear down the communication session between the mobile server and the requesting entity.

23 Claims, 7 Drawing Sheets

SYSTEM, APPARATUS, AND METHOD FOR ACCESSING MOBILE SERVERS

FIELD OF THE INVENTION

This invention relates in general to servers, and more particularly, to mobile servers that exist within a firewall protected environment.

BACKGROUND OF THE INVENTION

The role of the mobile terminal in today's communications networks is rapidly becoming more and more integrated with the Internet model, as the mobile terminal adapts to user's demands for added functionality. The mobile terminal, for example, has evolved from a simple device offering voice only capability to a device fully capable of browsing the Internet and providing rich content communication to include voice, data, imaging, video, etc.

Conventional communication methods with mobile terminals typically require active intervention by the users in possession of those mobile terminals. Specifically, today's mobile terminals essentially allow contact with the user of the mobile terminals through the use of voice or data calls that may be initiated with the Session Initiation Protocol (SIP). The use of various messaging technologies involving the mobile terminal may also involve messaging services such as the Short Messaging Service (SMS) and Multimedia Messaging Service (MMS). Alternatively, the user of the mobile terminal may access information services on the Internet through the use of the Wireless Application Protocol (WAP) which is based on Internet standards such as HyperText Markup Language (HTML), eXtensible Markup Language (XML), and Transmission Control Protocol/Internet Protocol (TCP/IP).

As mobile terminal sophistication continues to develop, the mobile terminal's informational role in the mobile communication age tends to evolve from one of a uni-directional information sink, to more of a bi-directional information access point, whereby information gathered by the mobile terminal may find application with other users within the communication network. In such an instance, information gathered and stored within each user's mobile terminal may, to an increasing extent, be made available to other users in the communication network, whether they are land based or mobile themselves. For example, mobile terminals having imaging capability, may capture images and/or video clips that may then be shared with other users within the mobile IP network. Additionally, mobile terminals having proximity connection capability, may access information contained within devices that are in close proximity and may likewise share that information with others in the mobile IP network.

As a precaution, however, mobile operators place firewalls within their networks in order to counteract possible attacks and flooding of the mobile IP network. As such, access to the mobile terminals that are operating behind these firewalls is typically limited to outgoing traffic that is initiated by the users of these mobile terminals and the resulting incoming traffic. Most other requests originating from outside the firewall are trapped by the firewall and are prevented from reaching their final destination, i.e., the mobile terminal.

Prior art solutions may provide a dedicated access point to the mobile terminals within the mobile IP network, whereby any firewalls that may impede information access requests to the mobile terminals are removed. Such a remedy, however, is outweighed by the risks associated with, for example, Denial of Service (DoS) attacks that may occur in the absence of the firewalls. Other prior art solutions provide holes within the firewalls, such that access requests to static IP addresses, for example, are allowed. IP enabled mobile terminals, however, are not generally provided with static IP addresses, but are rather allocated IP addresses using, for example, the Dynamic Host Configuration Protocol (DHCP), which renders static holes within the firewalls useless to the mobile terminals.

Accordingly, there is a need in the communications industry for a system, apparatus and method that allows access to information from within a mobile terminal that is behind a firewall. In particular, interesting information either contained within the mobile terminal or information that may be accessed by proximity connections to the mobile terminal, should be made available to the network via the mobile terminal even when the mobile terminal is protected by firewall access restrictions.

SUMMARY OF THE INVENTION

To overcome limitations in the prior art, and to overcome other limitations that will become apparent upon reading and understanding the present specification, the present invention discloses a system, method, and apparatus for providing access to a mobile server when the mobile server is operating within a firewall protected environment.

In accordance with one embodiment of the invention, an information system comprises a network entity operating within a first mobile network and is adapted to provide data requests to a second mobile network, a first firewall that is coupled to the second mobile network and is adapted to screen the data requests received from the network entity, a mobile server operating within the second mobile network and is adapted to provide data in response to the data requests, and a socket gateway coupled between the network entity and the first firewall and is adapted to facilitate access to the mobile server from the network entity. The data requests are converted into a format that is transparent to the first firewall.

In accordance with another embodiment of the invention, a mobile terminal capable of being wirelessly coupled to a firewall protected network comprises a memory capable of storing at least a protocol interface, a processor coupled to the memory and configured by the protocol interface to respond to format converted content requests. The format converted content requests being transparent to the firewall protected network and generated by a socket gateway operating outside of the firewall protected network. The mobile terminal further comprises a transceiver configured to facilitate a content exchange with the socket gateway in response to the format converted content requests.

In accordance with another embodiment of the invention, a computer-readable medium having instructions stored thereon which are executable by a mobile terminal for facilitating data transfer to network elements operating outside of a firewall protected mobile network. The instructions perform steps comprising receiving a connection request in a first format from a trusted entity operating outside of the firewall protected mobile network, where the connection request is converted from a second format to be transparent to the firewall protected mobile network. The instructions perform steps further comprising establishing the connection with the trusted entity in response to the connection request, and transferring data to the network elements. The data intended for the network elements is addressed to the trusted entity.

In accordance with another embodiment of the invention, a method of providing data from a mobile server to network elements operating outside of a firewall protected mobile domain comprises requesting addresses corresponding to links associated with data controlled by the mobile server, converting the requested addresses to an address of a trusted entity operating outside of the firewall protected mobile domain, transmitting requests for data to the trusted entity using the converted addresses, and converting the requests for data into a format that is transparent to the firewall protected mobile domain.

In accordance with another embodiment of the invention, a computer-readable medium having instructions stored thereon which are executable by a socket gateway for facilitating data transfer between network elements of a first firewall protected domain and a mobile server of a second firewall protected domain. The instructions perform steps comprising receiving data requests of a first protocol type from the network elements, converting the data requests to a second protocol type that is transparent to the second firewall protected domain, transmitting the converted data requests to the mobile server, and receiving data from the mobile server in response to the converted data requests.

In accordance with another embodiment of the invention, a socket gateway within a network used to facilitate an exchange of data between two firewall protected networks comprises means for receiving data requests of a first protocol type from network elements in a first firewall protected network, means for converting the data requests to a second protocol type that is transparent to a second firewall protected network, means for transmitting the converted data requests to a mobile server operating within the second firewall protected network, means for receiving data from the mobile server in response to the converted data requests, and means for relaying the received data to the network elements.

These and various other advantages and features of novelty which characterize the invention are pointed out with greater particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

Figure 1:
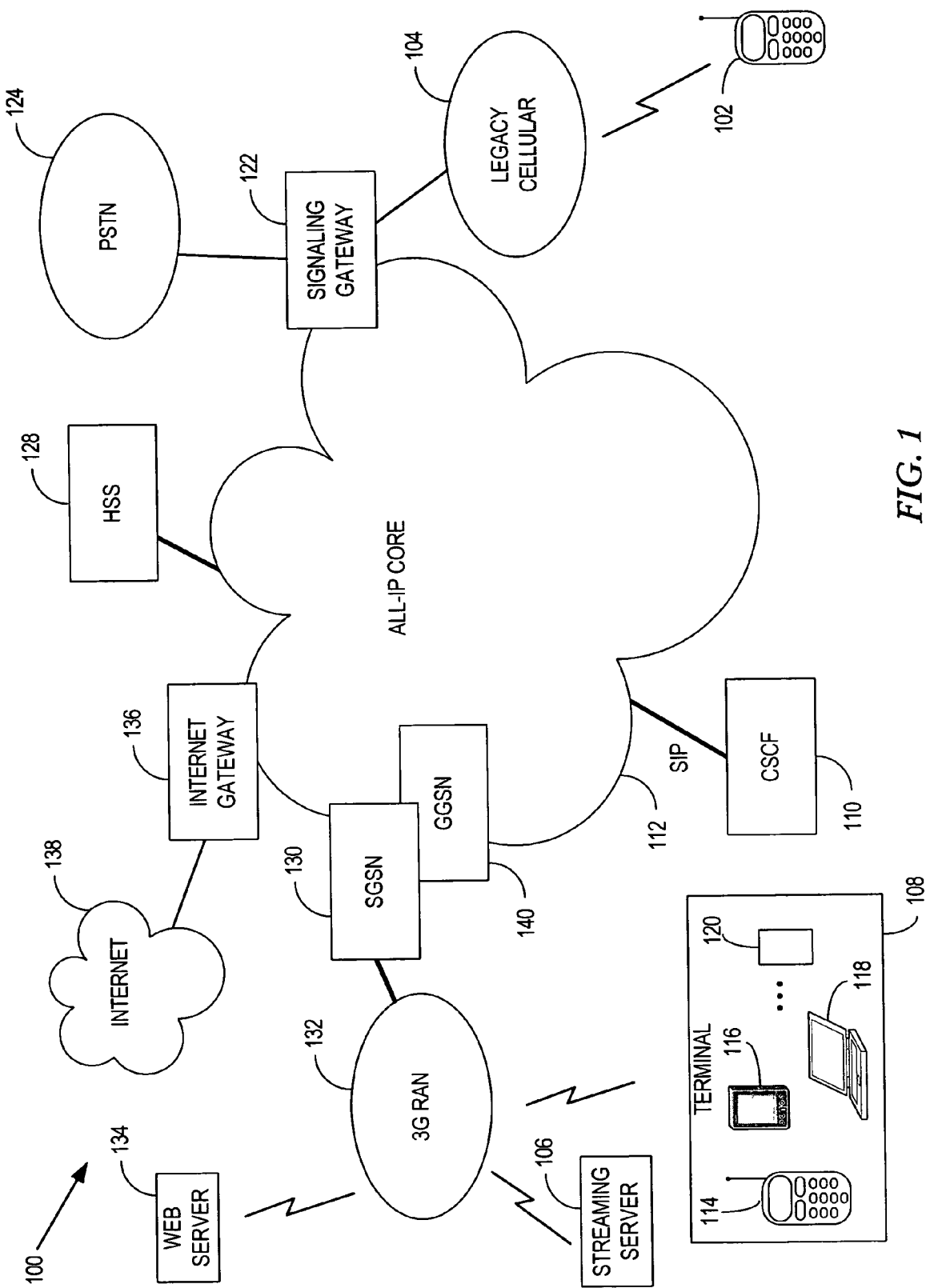
FIG. 1 illustrates an exemplary system architecture in accordance with the present invention.

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to a system, apparatus, and method that allow a mobile terminal to be accessed as a mobile server even when the mobile server is operating behind a mobile operator's firewall. The mobile server provides a mechanized data/service consumption model where conventional services and data may be accessed from the mobile server via IP based traffic originating from outside the firewall.

In particular, client systems operating outside of a firewall protected mobile network may interact with the mobile server using a model based on a rich set of meta-data made possible with interpretable XML, where the transport is typically HTTP. Alternatively, other transport mechanisms such as the Real-Time Transport Protocol (RTP) may be used to accommodate voice and other multimedia content, such as video or animation, where an application level protocol such as the Real-Time Streaming Protocol (RTSP) administers control over the delivery of the real time data. Client systems operating outside of the firewall protected mobile network may submit access requests via, for example, SIP, WAP Push, or SMS, since these access mechanisms may be used to bypass the firewall protection. Accordingly, the mobile server according to the present invention is well suited for the ALL-Internet Protocol (IP) architecture for future ALL-IP networks, but is equally well suited to function within legacy mobile communication systems such as the Global System for Mobile Communications (GSM), General Packet Radio Service (GPRS), and Third Generation (3G) systems.

The Web services and/or data provided by the mobile server of the present invention provide sets of services and information over the Internet and the Mobile domain to appropriate service consumers. Such Web services may be provided over a session layer, e.g., HTTP, SMTP, File Transfer Protocol (FTP), RTSP, or any other similar Internet technology. Web services utilize certain, industry standard software technologies, such as XML, XML Protocol (XMLP), Simple Object Access Protocol (SOAP), Web Services Description Language (WSDL), and Universal Description, Discovery, and Integration (UDDI). The Web services are not specific to any particular mobile terminal platform and are offered in a manner that allows: 1.) discovery of the mobile services/information offered by the mobile server; 2.) interpretation of the service/information offerings from a registry of services; and 3.) invocation of service/information requests with the appropriate request parameters that facilitates correct response interpretation.

An exemplary diagram of communication system 100 in accordance with the present invention is illustrated in FIG. 1. ALL-IP core 112 provides the common, IP based signaling core utilized by communication system 100 to integrate various fixed, mobile, and, Internet networks. ALL-IP core 112 allows all communication services to be carried over a single network infrastructure, thus enabling the integration of voice, data, and multimedia services. Further, ALL-IP core 112 allows network resources to be used more efficiently, where increased capacity may be deployed as necessary to meet demand. It should be noted that while mobile services and information according to the present invention may be implemented through the use of IP enabled mobile terminals 108, 106, and 134, they may also be implemented through the use of legacy mobile terminals 102 as well.

ALL-IP system 100 is optimized to support multimedia services, where Call State Control Function (CSCF) 110 implementing SIP is a key ingredient in providing the multimedia services to all IP enabled devices. Although SIP's primary objective was meant for multimedia sessions, its scope may be extended to presence, gaming, and IM, as well. Numerous applications can be implemented using SIP, allowing the combination of traditional telephony with messaging and multimedia.

Wireless terminals 108, 106, and 134 may represent any number of ALL-IP mobile communication devices, such as a cellular telephone 114, a personal digital assistant (PDA) 116, a notebook or laptop computer 118, or any other type of ALL-IP wireless terminal represented by device 120. 3G Radio Access Network (RAN) 132 represents a combination of all mobile radio standards, such as GSM/Enhanced Data Rates for Global Evolution (EDGE) and Wideband Code Division Multiple Access (WCDMA). Each mobile radio standard has its own distinct network architecture and transport mechanism, which is fully integrated using the IP protocol, where Serving GPRS Support Node (SGSN) 130 and Gateway GPRS Support Node 140 provides the RAN interface to ALL-IP core 112.

ALL-IP system 100 supports Legacy Cellular systems 104 that offers communication support to non ALL-IP terminal 102, for example. Signaling gateway 122 performs all necessary Signaling System No. 7 (SS7) and Mobile Application Part (MAP) signaling conversions as necessary to provide SS7 over IP access from PSTN 124 and MAP over IP access from Legacy Cellular system 104 to ALL-IP core 112. In addition, signaling gateway 122 provides Short Message Service Center (SMSC) support and Multimedia Message Service Center (MMSC) support for any SMS and MMS operations as required by mobile terminal 102.

Internet 138 access from ALL-IP core 112 is provided through internet gateway 136 to allow accesses defined by Uniform Resource Locator (URL) and Uniform Resource Identifier (URI) address definitions. Home Subscriber Server (HSS) 128 provides ALL-IP core 112 with the many database functions that are required in ALL-IP networks. HSS 128, for example, includes Home Location Register (HLR) and Domain Name Server (DNS) operations.

In one embodiment in accordance with the present invention, Web server 134 is implemented by a mobile terminal that may provide access to Web pages requested via network entities connected to ALL-IP core 112. Such requests traverse GGSN 140, SGSN 130, and a firewall (not shown) internal to SGSN 130 via SIP, WAP Push, SMS, MMS, or any other mechanism that is transparent to the firewall (not shown). The Web pages that are requested using Uniform Resource Locator (URL) identification may be converted to IP addresses by the DNS internal to HSS 128, which are then used to access the requested Web page host.

In an alternate embodiment, streaming server 106 may be implemented by a mobile server in accordance with the present invention, whereby an alternate transport is used, such as RTP, to deliver streamed audio and/or video content to requesting entities within ALL-IP core 112. Such a streamed delivery being facilitated by mobile terminal 106 functioning as a streaming server either via content stored within the mobile terminal, or conversely, via content proximately accessed by streaming server 106 via any one of a number of proximity access mechanisms, such as Wireless Local Area Network (WLAN), Bluetooth, or InfraRed (IR) to name only a few.

In accordance with the present invention, therefore, a mobile server is provided that resides on the mobile platform of IP enabled mobile terminals 106, 108, and 134, or alternately, the legacy mobile platform offered by mobile terminal 102. The mobile terminals are addressable within network 100 so that specific services/information may be provided by the mobile terminal to any requesting network entity. The mobile terminals extend the concept of providing static content, such as personal contact information, to providing mobile server dynamic content. In particular, the dynamic content provided by the mobile terminals may be extremely versatile and may provide, for example, network sharing of images captured using internal/external imaging capability of the mobile terminals, extended rich call functionalities, streaming content, telemetry, or other information that may be routed from a local area proximity connection.

The mobile terminals may also implement a Web server function as depicted by mobile terminal 134. In such instances, for example, entities operating within ALL-IP system 100 may first contact a DNS within HSS 128 to translate the name of Web server 134 to an IP address, which is then used to form a virtual connection to Web server 134 using, for example, HTTP. An HTTP GET request sent from the entities' browser to Web server 134 then results in the delivery of a file in, for example, HTML or XML, format. The HTML tags of the file sent by Web server 134 are then construed by the entities' browser in order to format the body of the requested file in accordance with the display capabilities of the requesting entity.

As discussed above, mobile network operators typically place firewalls at the interconnection between their private mobile networks and other public networks, e.g., ALL-IP CORE 112. The firewalls act like one-way gates, whereby requests originating from within the private mobile networks are generally allowed to pass through, while most other requests originating from public networks outside the firewalls are blocked. Certain types of requests from the public networks are allowed, such as some HTTP requests, SMTP email transfers, and DNS queries. These types of legitimate requests may be identified by the firewall through examination of the destination IP address in the IP header and the destination port number in the User Datagram Protocol (UDP) or TCP headers.

The nature of the interaction between SIP and the mobile network operator's firewalls, on the other hand, depends upon the transport protocol that is used. If the SIP user agent client is using UDP to initiate the session, for example, then the user agent's firewall will allow the SIP messaging. All responses to the SIP messaging, however, will be refused by the firewall, since the UDP responses are not associated with the outgoing requests. If TCP is being used as the transport, on the other hand, a SIP user agent operating behind a firewall will be successful in the establishment of the session, since the SIP responses are sent to the TCP connection that was opened by the user operating behind the firewall.

Conventional firewalls, however, do not currently allow packets having media types other than HTTP, such as RTP, to be exchanged between users on either side of the firewall. In accordance with the present invention, therefore, a socket gateway is contemplated, which provides the firewall with a peer entity that is trusted by the firewall. In such an instance, all traffic that is either initiated, or terminated, by the socket gateway is allowed to pass through the firewall without obstruction. Thus, any packets that are directed to or from the socket gateway may be authenticated and validated to generally enforce whatever security procedures are required by the respective firewalls. The socket gateway in accordance with the present invention may be part of the 3GPP IP Multimedia Subsystem (IMS) operating within CSCF 110, or some other network element.

Figure 2:
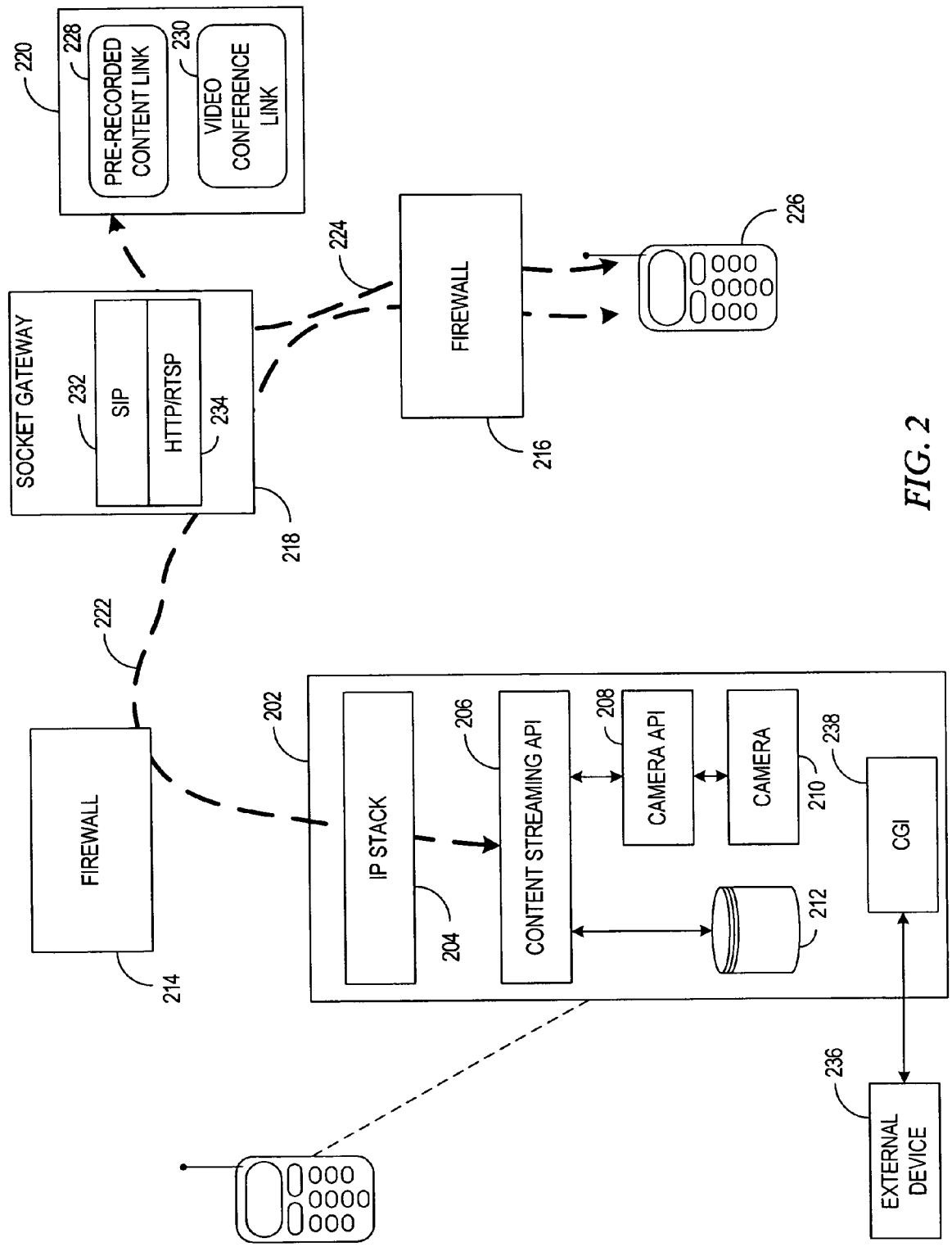
FIG. 2 illustrates a streamed content delivery system in accordance with the present invention.

In one embodiment in accordance with the present invention, streamed content delivery from a mobile streaming server operating behind one or more firewalls is facilitated. An exemplary block diagram of such a system is illustrated in FIG. 2, whereby mobile terminal 202 functions as a streamed content server to a requesting entity, e.g., mobile terminal 226. The streamed content may either be pre-recorded and stored within database 212, or may be provided live using camera 210 and camera Application Programming Interface (API) 208.

In an alternate embodiment, the streamed content may be accessed from external device 236 that is in a proximity connection to Common Gateway Interface (CGI) 238. Such proximity connections may include, but are not limited to, Bluetooth, WVLAN, IR, or even a wired connection, such as FireWire. In the embodiment exemplified in FIG. 2, mobile terminal 202 is directly supplying audio/video content to mobile terminal 226 through a streaming protocol, such as RTP/RTSP, located within IP stack 204, in conjunction with content streaming API 206.

For purposes of this embodiment, a container file may be used by mobile server 202, in which a storage entity within database 212 is used to store multiple continuous media types pertaining to the same media stream requested by mobile terminal 226. In effect, the container file represents an RTSP presentation, where each of its components is RTSP streams. While the components are transported as independent streams, it is desirable to maintain a common context for those streams at the server end so that the server may easily keep a single storage handle open, as well as to preserve equal priority treatment of the media streams.

Most streaming technologies are based on RTSP, which offers a way of controlling the streamed presentation, e.g., seeking, playing, and pausing, whereas SIP is used to initiate the streaming session. The RTSP stack is divided into three modules: MSG, RTSP, and NTR/MSS. The MSG module interface handles generic message parsing and is also used with SIP. The RTSP module is similar to the SIP module and has functions for encoding and decoding header strings for structures and vice versa. NTR contains the agent and session objects which manage the sending and receiving of messages. The Media Subsystem (MSS) module controls the media processing of the top layer of the stack.

In one embodiment, mobile server 202 may register its streaming services to registry 220 located within, for example, Internet 138 of FIG. 1. Registry 220 may, for example, advertise links 228 and 230 as being available for audio/video streaming from mobile server 202. The first registered link to mobile server 202 may be link 228, which points to pre-recorded content that has been stored within database 212. A second link to mobile server 202 may be a video conference link 230 that may be used, for example, to initiate a live video conference session with the user of mobile server 202 and requesting entity 226. Using a mobile browser within mobile terminal 226, links 228-230 may be ascertained and located by mobile terminal 226 via path 224 through the normal course of a mobile browsing session.

These links may then be used by mobile terminal 226 to access the audio/video content contained within mobile server 202. As discussed above, direct access by mobile terminal 226 to the audio/video content contained within mobile server 202 is generally curtailed by the operation of firewalls 216 and 214, which are operating in the user domains of mobile terminals 226 and 202, respectively. In accordance with the present invention, therefore, socket gateway 218 intercedes on behalf of mobile client 226 and mobile server 202 as a trusted peer entity to firewalls 216 and 214 to facilitate the audio/video exchange.

In particular, socket gateway 218 may exist within CSCF 110 of FIG. 1 and may be accessible via any one of a number of access protocols, such as HTTP, SIP, WAP, RTSP, or SMS. Mobile terminals 202 and 226 may then utilize signalling path 222 to facilitate communications with socket gateway 218 using the appropriate access protocol. Exemplary HTTP/RTSP module 234 contained within socket gateway 218 is utilized, for example, by mobile terminal 226 as an access mechanism to initiate the request for the audio/video content contained within database 212 of mobile server 202 as advertised by registry 220. Once the audio/video content is discovered, mobile terminal 226 then issues a request to a DNS (not shown) within HSS of FIG. 1 for the IP address of Web server 202 that contains the desired audio/video content. The IP address of socket gateway 218, however, is instead supplied by the DNS to mobile terminal 226 in reply, since intervention by socket gateway 218 is required for proper operation within firewalls 214 and 216.

An RTSP message using, for example, the DESCRIBE method may then be issued by mobile terminal 226 to socket gateway 218 via path 222 to first inquire as to the description of the media content contained within mobile server 202 that is to be provided by the streaming session. Once received, socket gateway 218 informs mobile server 202 of the streaming request via a method that is friendly to firewall 214, e.g., SIP, WAP push, or SMS. If SIP is used, for example, a SIP INVITE method may be transmitted by socket gateway 218 to mobile server 202, whereby socket gateway 218 is identified by firewall 214 as a trusted requesting entity. Furthermore, in the Session Description Protocol (SDP) of the SIP INVITE method, the media may be described as RTSP streamed, audio/visual media. In this way, socket gateway 218 acts as a SIP user agent to send the INVITE request to mobile server 202, which propagates through firewall 214 unobstructed. Mobile server 202 may then transmit a 200 OK response provided the streaming session is accepted, which is then followed by an ACKnowledge (ACK) message from socket gateway 218.

Once the session has been established, the streaming session between mobile terminal 226 and mobile server 202 may then commence via the connection established by the SIP signalling. Table 1 is presented for exemplary purposes in order to illustrate a possible streaming session exchange between mobile terminal 226 and mobile server 202, where mobile terminal 226 is requesting, for example, a video conference session with the user of mobile server 202.

TABLE 1

| MESSAGE | CONTENTS |
|---------|----------|
| 250 | DESCRIBE rtsp://server/conference RTSP/1.0<br>CSeq: 1 |
| 252 | RTSP/1.0 200 OK<br>CSeq: 1 |

TABLE 1-continued

| MESSAGE | CONTENTS |
|---|---|
| | Content-Type: application/sdp |
| | Content-Length: 164 |
| | v = 0 |
| | o = − 2890844256 2890842807 172.16.2.93 |
| | s = RTSP Session |
| | i = Conference call |
| | a = control:rtsp://server/conference |
| | t = 0 0 |
| | m = audio 0 RTP/AVP 0 |
| | a = control:rtsp://server/conference/audio |
| | m = video 0 RTP/AVP 26 |
| | a = control:rtsp://server/conference/video |
| 254 | SETUP rtsp://server/conference/audio RTSP/1.0 |
| | CSeq: 2 |
| | Transport:RTP/AVP;unicast;client_port = 8000-8001 |
| 256 | RTSP/1.0 200 OK |
| | CSeq: 2 |
| | Transport:RTP/AVP;unicast;client_port = 8000-8001; |
| | server_port = 9000-9001 |
| | Session: 12345678 |
| 258 | SETUP rtsp://server/conference/video RTSP/1.0 |
| | CSeq: 3 |
| | Transport:RTP/AVP;unicast;client_port = 8002-8003 |
| | Session: 12345678 |
| 260 | RTSP/1.0 200 OK |
| | CSeq: 3 |
| | Transport:RTP/AVP;unicast;client_port = 8002-8003; |
| | server_port = 9004-9005 |
| | Session: 12345678 |
| 262 | PLAY rtsp://server/conference RTSP/1.0 |
| | CSeq: 4 |
| | Range: npt = 0- |
| | Session: 12345678 |
| 264 | RTSP/1.0 200 OK |
| | CSeq: 4 |
| | Session: 12345678 |
| | RTP-Info: url = rtsp://server/conference/video; |
| | seq = 9810092;rtptime = 3450012 |

Message 250 represents the initial description request sent by mobile terminal 226 to socket gateway 218, in which a description of the stream "conference" at location "//server" is requested. As discussed above, message 250 initiates the SIP exchange between socket gateway 218 and mobile server 202 through firewall 214 to establish the streaming session between mobile server 202 and mobile terminal 226. In message 252, mobile server 202 responds with an SDP description of the stream "conference," in which audio and video media descriptions are defined with the transport specified as RTP/Audio Video Protocol (AVP) and separate control for each.

Messages 254 and 256 make up a portion of the media stream sequence, whereby client and server ports for the audio stream are requested and acknowledged by the client, i.e., socket gateway 218, and the server, i.e., mobile terminal 202, respectively. It should be noted that client ports 8000-8001 correspond to the audio RTP ports associated with socket gateway 218 that are trusted by firewall 214. Messages 258 and 260 make up another portion of the media stream sequence, whereby client and server ports for the video stream are similarly requested and acknowledged by client 218 and server 202, respectively. It should further be noted that client ports 8002-8003 correspond to the video RTP ports associated with socket gateway 218 that are trusted by firewall 214. Messages 262 and 264 makeup the client's instruction to the server to begin transmission of the conference session.

A similar messaging transaction transpires between socket gateway 218, firewall 216, and mobile terminal 226, in order to complete setup of the RTSP streaming session. That is to say, that the corresponding audio/video ports between socket gateway 218 and mobile terminal 226 via firewall 216 are opened, whereby audio/video ports associated with socket gateway 218 are trusted by firewall 216. In this way, socket gateway 218 functions as the trusted client to firewall 214 as well as the trusted server to firewall 216 when the RTSP session is setup, since socket gateway 218 appears as both the requesting client to firewall 214 and the requested server to firewall 216.

Figure 3:
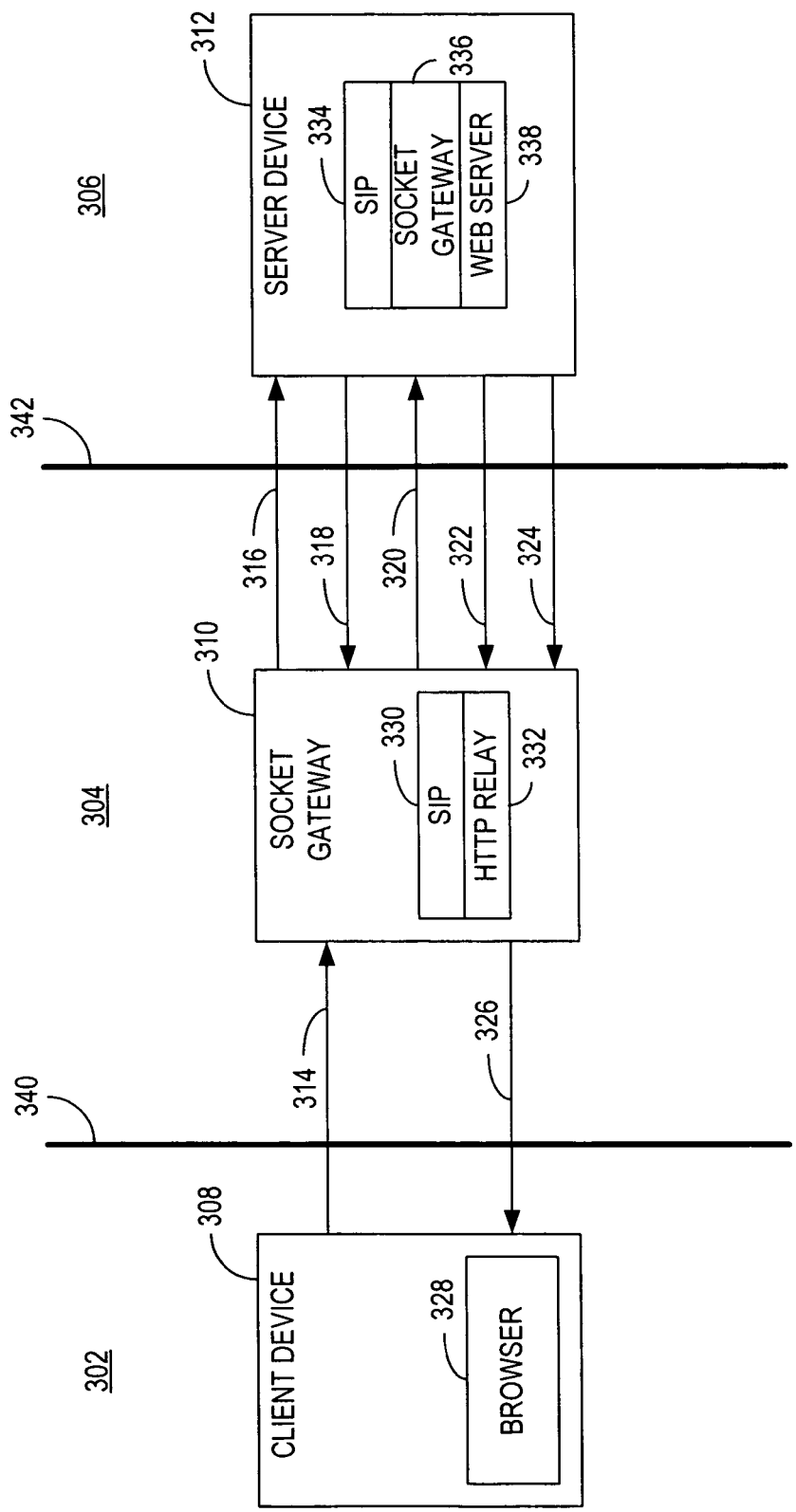
FIG. 3 illustrates a HyperText Transport Protocol (HTTP) relay block diagram in accordance with the present invention.
Figure 4:
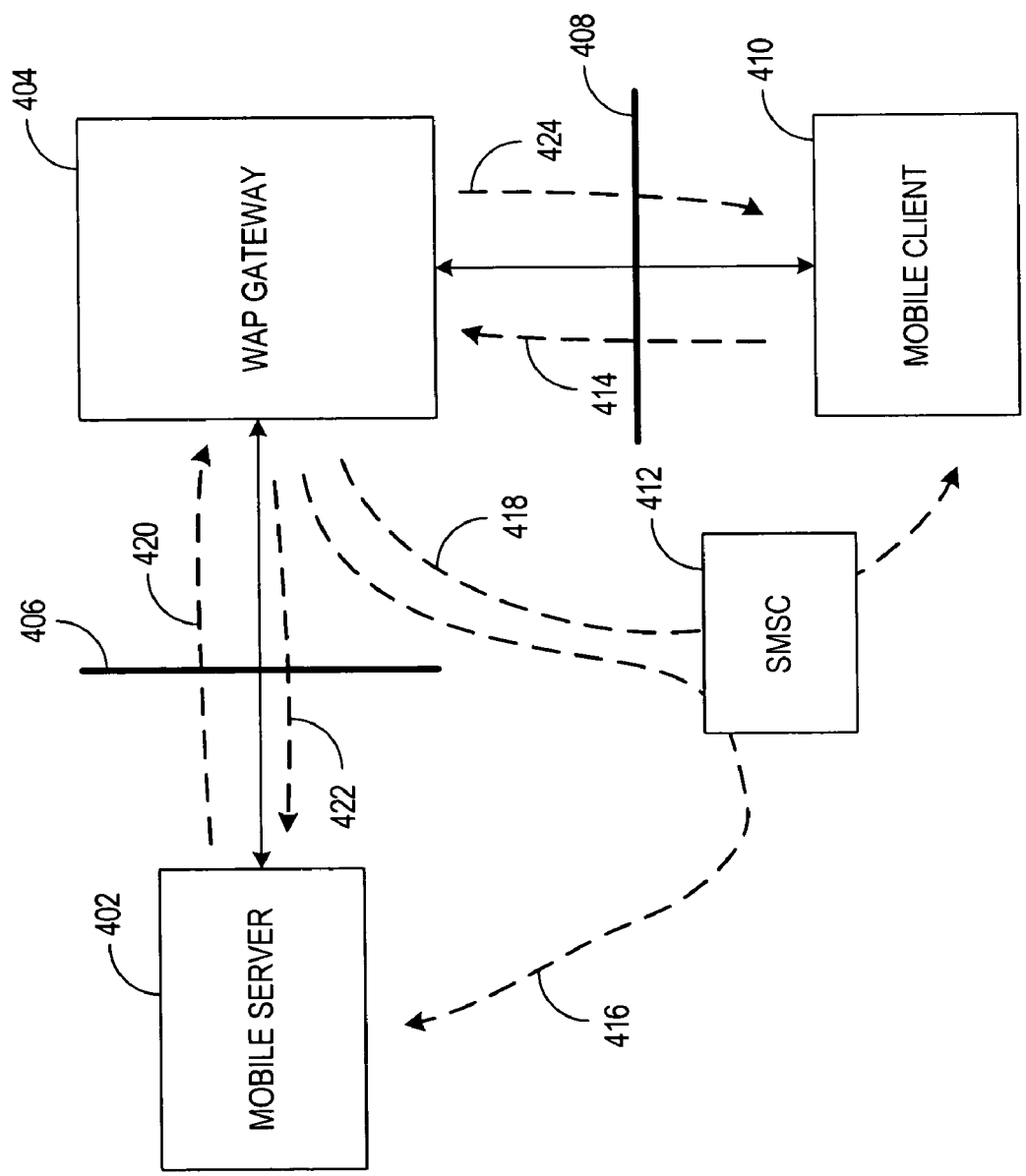
FIG. 4 illustrates a Wireless Application Protocol (WAP) transfer mechanism from a mobile server in accordance with the present invention.

In an alternate embodiment according to the principles of the present invention, FIG. 3 illustrates that socket gateway 310 may act as an HTTP relay between mobile server 312 and mobile client 308 within the Internet or other network 304. Client device 308 is operating within mobile domain 302 behind firewall 340, while server device 312 is operating within mobile domain 306 behind firewall 342. Socket gateway 310 may be operating within CSCF 110 of FIG. 1, for example, which may operate as a relay for HTTP traffic and informs server device 312 that an impending HTTP request is forthcoming from client device 308. Each of socket gateway 310 and server device 312 contain SIP functionality blocks 330 and 334, respectively, to allow for session initiation that is transparent to firewall 342 as discussed above.

Prior to sending message 314, client device 308 learns of the presence of Web server 338 and its contents through service discovery methods implemented via browser 328. DNS queries for the IP address associated with Web server 338 leads instead to the discovery of the IP address for socket gateway 310, since socket gateway 310 is operating as the HTTP relay between client device 308 and server device 312. In such an instance, socket gateway 310 is the trusted server entity associated with firewall 340 that is to handle the HTTP requests from client device 308. Client device 308 then transmits HTTP GET message 314 to socket gateway 310 using the DNS supplied IP address, whereby the desirable Web page, or other content that is associated with Web server 338, is requested.

Message 316 contains information associated with HTTP GET message 314, whereby socket gateway 310 has formatted message 316 into a form that is transparent to firewall 342. In the case that message 316 represents a SIP INVITE message, for example, an SDP is included, which may describe the media request of message 314 as that of an HTTP relay media request and also includes the address of the Web page requested. Message 318 is then transmitted by socket gateway 336 of server device 312 as an HTTP GET message that is transparent to firewall 342 in order to ascertain a storage address within socket gateway 310 that may be available to cache the contents of the Web page requested by client device 308. Message 320 is an HTTP REPLY message, sent in response to message 318, to indicate the appropriate memory location within socket gateway 310 that may be used to cache the Web content received from Web server 338.

Message 322 is an HTTP POST message used by socket gateway 336 of server device 312 to cache the Web content into the memory location of socket gateway 310 that was provided by message 320. Once cached, HTTP REPLY message 326 may provide the Web content to client device 308 that was originally requested in message 314. Message 324 may be used by server device 312 as a SIP BYE message, in the event that server device 312 wishes to clean the cache of socket gateway 310 that was used to store the requested Web content. Otherwise, message 324 may be bypassed in order to leave the SIP session open, thus allowing HTTP reply messages to be immediately sent by socket gateway 310 for client device 308 without the need for waiting for the request to be sent from server device 312.

In other embodiments according to the present invention, data access from mobile server 402 may be performed in a number of different ways by using the WAP push architecture. For example, the WAP push architecture allows a Push Proxy Gateway (PPG), e.g., WAP gateway 404, to send data to a requesting terminal, e.g., mobile terminal 410, in an asynchronous manner. WAP gateway 404 and mobile server 402 communicate using the Push Over The Air (OTA) protocol, which utilizes either Wireless Session Protocol (OTA-WSP) and/or HTTP (OTA-HTTP) services. Connection oriented push requires some point to point connectivity, e.g., a push session if OTA-WSP is used or a TCP connection if OTA-HTTP is used, before the push content can be delivered.

It is possible, however, that since the WAP push architecture is asynchronous by nature, that no push session exists, e.g., OTA-WSP, that no TCP connection has been established, e.g., OTA-HTTP, or that the desired bearer is not utilized when content is about to be pushed to WAP gateway 404 from mobile server 402, or from WAP gateway 404 to mobile client 410. The Session Initiation Application (SIA) executing within mobile server 402 and mobile client 410, therefore, allows WAP gateway 404 to establish either a push session or a TCP connection via a specific bearer, such as the SMS supported by Short Message Service Center (SMSC) 412. The process of sending SIA content to a mobile terminal is referred to as a Session Initiation Request (SIR).

In one embodiment according to the present invention, contents from mobile server 402 may be fetched by using an SIR of the WAP Push architecture. After receiving HTTP GET request 414 from mobile client 410 via firewall 408, for example, WAP gateway 404 must then retrieve the contents requested by HTTP GET request 414 from mobile server 402. WAP gateway 404 then sends SIR 416 to mobile server 402 via SMSC 412, to instruct mobile server 402 to establish a TCP connection with WAP gateway 404 via firewall 406. WAP gateway 404 then uses HTTP POST message 422 with a modified IP address to supply mobile server 402 with the identification of the requesting client, i.e., the IP address is modified to replace mobile client 410 with WAP gateway 404 as the requesting client.

Message 418 represents an SIR message used by WAP gateway 404 to request a TCP connection between WAP gateway 404 and mobile client 410. Within the SIR message, contact points may be identified by WAP gateway 404 to mobile client 410 that provides mobile terminal 410 with port numbers that may be used by mobile client 410 to establish the TCP connection. Mobile client 410 then uses the ports to create the TCP connection to WAP gateway 404 as in message path 414. In message 422, WAP gateway 404 then issues an HTTP POST request to mobile server 402 to request content contained within the mobile server that was requested by mobile client 410 in message 414. Finally, WAP gateway 404 encapsulates the content received from mobile server 402 via message 420 into HTTP response message 424 to complete the data transfer.

Figure 5:
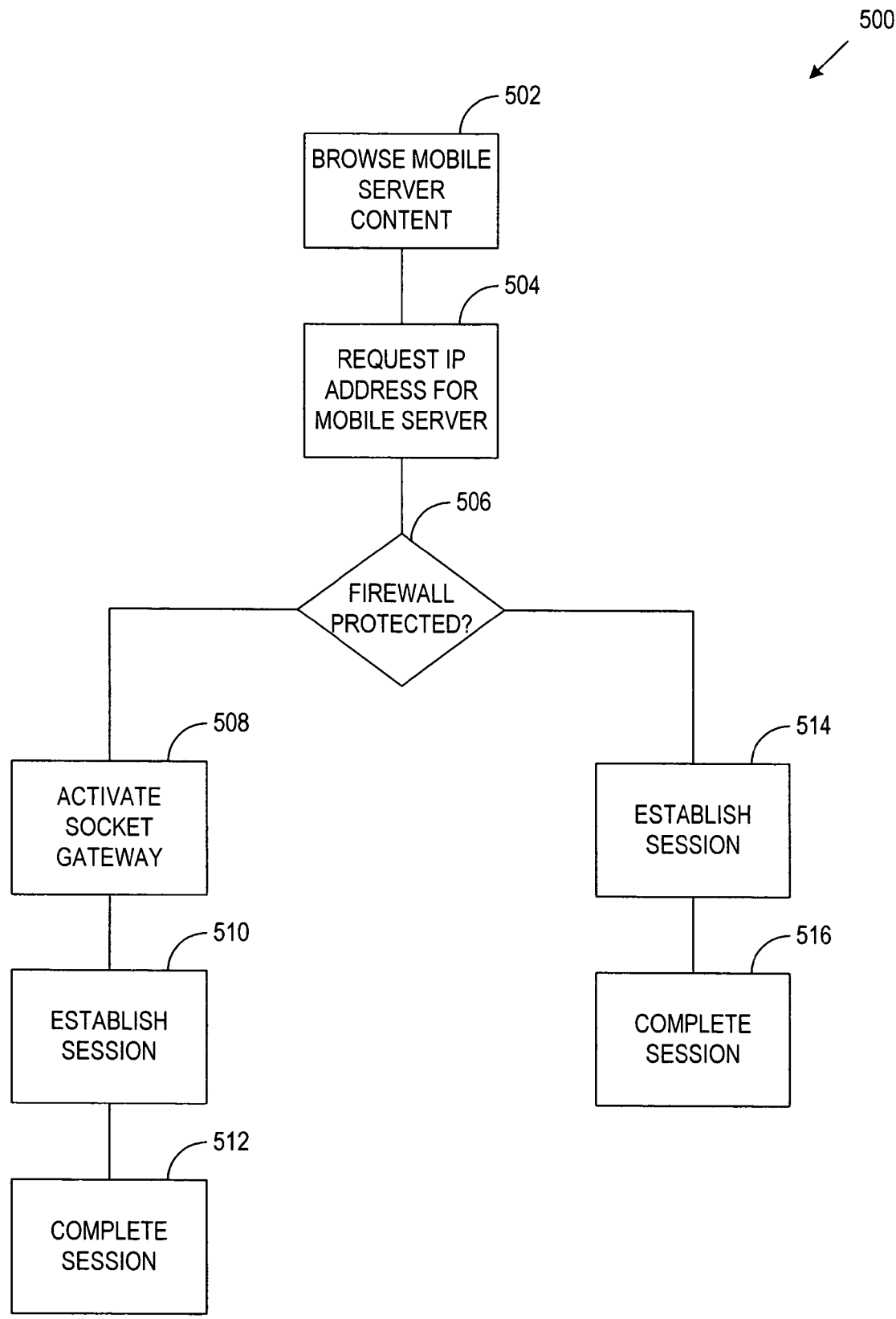
FIG. 5 illustrates an exemplary flow diagram of execution steps taken to access data contained within a mobile server that is protected by a firewall.

Several embodiments in accordance with the present invention are presented that facilitate access to a mobile server that is protected by a firewall. Such access may be facilitated from any network entity, mobile or otherwise, that is itself protected by a firewall. Such embodiments generally follow the execution steps exemplified by flow diagram 500 of FIG. 5.

In step 502, for example, mobile server content is discovered by a browser operating within communication system 100 as exemplified in FIG. 1. Access to the discovered content first requires an IP address of the mobile server, which is requested as in step 504 from a DNS operating within HSS 128 of FIG. 1. If the mobile server is operating within a mobile network that is protected by a firewall as determined in step 506, then a reply to the IP address request of step 504 contains the IP address of a socket gateway, instead of the IP address of the mobile server. In such an instance, further communications by the requesting entity are conducted with the socket gateway, since the IP address provided to the requesting entity is that of the socket gateway. Thereafter, the socket gateway is activated as in step 508 to intercede on behalf of the requesting entity, since the socket gateway is a firewall trusted entity.

The session between the requesting entity and the mobile server is then established as in step 510, such that the socket gateway is viewed by the mobile server as the destination for the requested content. Furthermore, the socket gateway is viewed by the requesting entity as the device providing the requested content until completion of the session as in step 512. In the event that the mobile server is not protected by a firewall as determined in step 506, the session establishment and tear down are accomplished as in steps 514 and 516 without activating the socket gateway as an interceding device.

Figure 6:
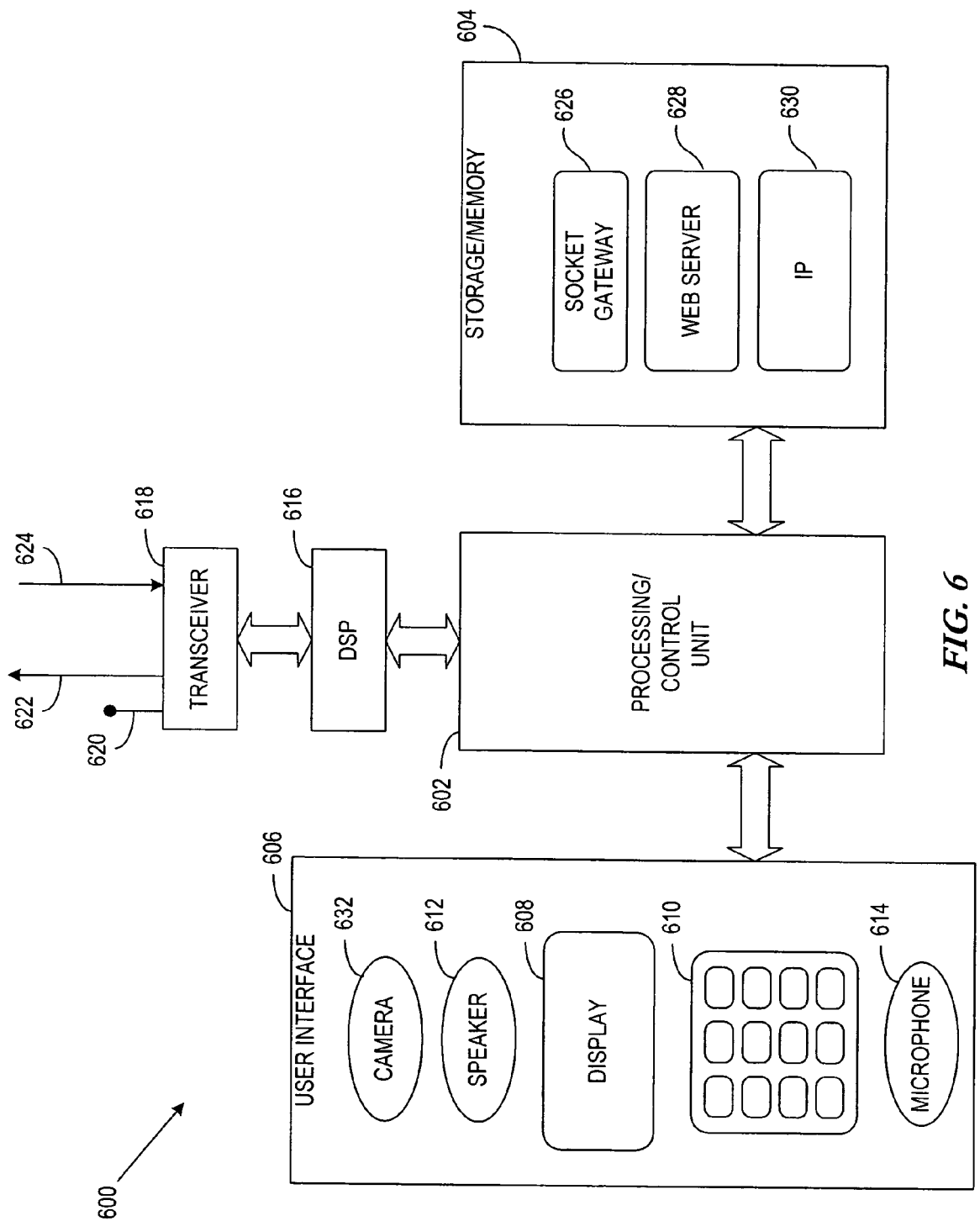
FIG. 6 illustrates a representative mobile computing arrangement suitable for performing mobile server functions in accordance with the present invention.

The invention is a modular invention, whereby processing functions within a mobile terminal may be utilized to implement the present invention. The mobile devices may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various mobile server functions described herein. An example of a representative mobile terminal computing system capable of carrying out operations in accordance with the invention is illustrated in FIG. 6. Those skilled in the art will appreciate that the exemplary mobile computing environment 600 is merely representative of general functions that may be associated with such mobile devices, and also that landline computing systems similarly include computing circuitry to perform such operations.

The exemplary mobile computing arrangement 600 suitable for implementing mobile server functions in accordance with the present invention may be associated with a number of different types of wireless devices. The representative mobile computing arrangement 600 includes a processing/control unit 602, such as a microprocessor, reduced instruction set computer (RISC), or other central processing module. The processing unit 602 need not be a single device, and may include one or more processors. For example, the processing unit may include a master processor and associated slave processors coupled to communicate with the master processor.

The processing unit 602 controls the basic functions of the mobile terminal, and also those functions associated with the present invention as dictated by IP module 630, socket gateway 626, and Web server 628 that are available in the program storage/memory 604. Thus, the processing unit 602 is capable of supplying mobile server content accessed via Web server 628 to requesting client terminals via IP protocols implemented by IP module 630. Socket gateway 626 provides the interface to a network based socket gateway that is the firewall trusted entity interceding on behalf of untrusted requesting client terminals. The program storage/memory 604 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the present invention, the program modules associated with the storage/memory 604 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 600 via data signals, such as being downloaded electronically via one or more networks, such as the Internet and an intermediate wireless network(s).

The processor 602 is also coupled to user-interface elements 606 associated with the mobile terminal. The user-interface 606 of the mobile terminal may include, for example, a display 608 such as a liquid crystal display, a keypad 610, speaker 612, internal camera 632, and microphone 614. These and other user-interface components are coupled to the processor 602 as is known in the art. Other user-interface mechanisms may be employed, such as voice commands, switches, touch pad/screen, graphical user interface using a pointing device, trackball, joystick, or any other user interface mechanisms.

The mobile computing arrangement 600 also includes conventional circuitry for performing wireless transmissions. A digital signal processor (DSP) 616 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 618, generally coupled to an antenna 620, transmits the outgoing radio signals 622 and receives the incoming radio signals 624 associated with the wireless device.

The mobile computing arrangement 600 of FIG. 6 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a mobile server system and apparatus in accordance with the present invention.

Figure 7:
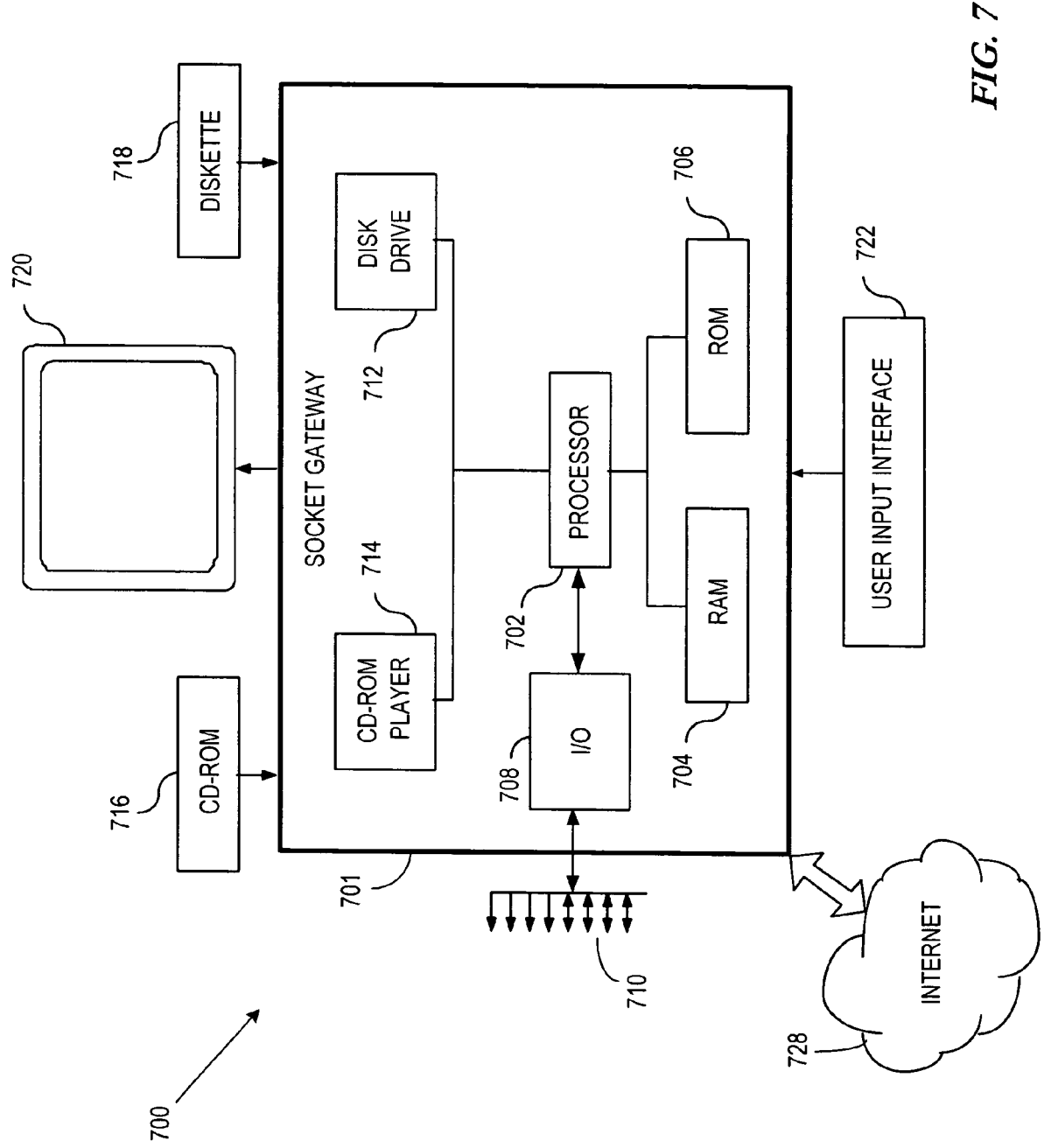
FIG. 7 is a representative computing system capable of carrying out socket gateway functions according to the present invention.

The network gateways or other systems for providing socket gateway functions in connection with the present invention may be any type of computing device capable of processing and communicating digital information. The network gateways utilize computing systems to control and manage the messaging activity. An example of a representative computing system capable of carrying out operations in accordance with the invention is illustrated in FIG. 7. Hardware, firmware, software or a combination thereof may be used to perform the various gateway functions and operations described herein. The computing structure 700 of FIG. 7 is an example computing structure that can be used in connection with such a socket gateway system.

The example computing arrangement 700 suitable for performing the gateway activity in accordance with the present invention includes socket gateway 701, which includes a central processor (CPU) 702 coupled to random access memory (RAM) 704 and read-only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bussing 710, to provide control signals and the like. External data storage devices, such as DNS or registries, may be coupled to I/O circuitry 708 to facilitate messaging functions according to the present invention. Alternatively, such databases may be locally stored in the storage/memory of socket gateway 701, or otherwise accessible via a local network or networks having a more extensive reach such as the Internet 728. The processor 702 carries out a variety of functions as is known in the art, as dictated by software and/or firmware instructions.

Socket gateway 701 may also include one or more data storage devices, including hard and floppy disk drives 712, CD-ROM drives 714, and other hardware capable of reading and/or storing information such as DVD, etc. In one embodiment, software for carrying out the gateway operations in accordance with the present invention may be stored and distributed on a CD-ROM 716, diskette 718 or other form of media capable of portably storing information. These storage media may be inserted into, and read by, devices such as the CD-ROM drive 714, the disk drive 712, etc. The software may also be transmitted to socket gateway 701 via-data signals, such as being downloaded electronically via a network, such as the Internet. Socket gateway 701 is coupled to a display 720, which may be any type of known display or presentation screen, such as LCD displays, plasma display, cathode ray tubes (CRT), etc. A user input interface 722 is provided, including one or more user interface mechanisms such as a mouse, keyboard, microphone, touch pad, touch screen, voice-recognition system, etc.

The socket gateway 701 may be coupled to other computing devices, such as the landline and/or wireless terminals via a network. The server may be part of a larger network configuration as in a global area network (GAN) such as the Internet 728, which allows ultimate connection to the various landline and/or mobile client/watcher devices.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A system comprising:
    a network entity operating within a first mobile network and adapted to target a data request to a second mobile network, wherein the data request comprises a hypertext transport protocol request;
    a first firewall coupled to the second mobile network and adapted to screen the data request received from the network entity;
    a mobile server operating within the second mobile network and adapted to provide a response to the data request; and
    a socket gateway coupled between the network entity and the first firewall and adapted to:
        receive the data request on behalf of the mobile server;
        convert the data request to a mobile services request that is allowed to pass through the first firewall;
        send the mobile services data request to the mobile server via the first firewall;
        receive the response from the mobile server based on hypertext transport protocol exchanges initiated by the mobile server with the socket gateway; and
        relay the response to the network entity.

2. The system according to claim 1, further comprising a Domain Name Server (DNS) adapted to provide an address of the socket gateway in response to requests for an address of the mobile server.

3. The system according to claim 1, further comprising a second firewall coupled to the first mobile network.

4. The system according to claim 3, wherein the socket gateway is adapted to operate as a trusted entity between the first and second firewalls.

5. The system according to claim 1, wherein the converting the data request includes converting the data request to one of Session Initiation Protocol (SIP), Wireless Application Protocol (WAP), or Short Messaging Service (SMS).

6. An apparatus comprising:
    a transceiver interface capable of being wirelessly coupled to a firewall protected network; and
    a processor coupled to the transceiver interface and configured to:
        receive a format converted content request from a socket gateway operating outside of the firewall protected network, wherein the format converted content request is based on a hypertext transport protocol request received at the socket gateway and converted by the socket gateway to a mobile services protocol that is allowed to pass through a firewall of the firewall protected network; and
    send a content response based on the format converted content request to the socket gateway based on a hypertext transport protocol content exchange initiated by the apparatus with the socket gateway, wherein the hypertext protocol exchange causes the socket gateway to relay the content response to an originator of hypertext transport protocol request.

7. The apparatus according to claim 6, wherein the mobile services protocol includes a Session Initiation Protocol (SIP).

8. The apparatus according to claim 6, wherein the memory is further capable of storing a socket gateway interface.

9. The apparatus according to claim 8, wherein the socket gateway interface is adapted to communicate with the socket gateway to conduct the content exchange.

10. A computer-readable medium comprising:
    instructions which are executable by a mobile terminal for facilitating data transfer to network elements operating outside of a firewall protected mobile network by performing steps comprising:
        receiving a mobile services request from a trusted entity operating outside of the firewall protected mobile network, the mobile services request being converted from a hypertext transport protocol request by the trusted entity to allow the hypertext transport protocol request to pass through a firewall;
        establishing a connection with the trusted entity in response to the mobile services request using hypertext transport protocol exchanges initiated by the mobile terminal; and
        transferring data to the network elements, wherein the data intended for the network elements is addressed to the trusted entity and relayed to the network elements via the trusted entity.

11. A method, comprising:
    receiving a request for addresses corresponding a mobile server operating in a firewall protected mobile domain;
    converting the requested addresses to an address of a trusted entity operating outside of the firewall protected mobile domain;
    transmitting a request for data to the trusted entity using the converted addresses;
    converting the request for data into a mobile services request that is allowed to pass through a firewall of the firewall protected mobile domain;
    send the mobile services request to the mobile server;
    receive a response to the request for data based on hypertext transport protocol exchanges initiated by the mobile server in response to the mobile services request; and
    relay the response to an initiator of the request for data.

12. The method according to claim 11, wherein requesting addresses comprises contacting a Domain Name Server (DNS).

13. The method according to claim 11, the requests for data are received via a HyperText Transfer Protocol (HTTP).

14. The method according to claim 13, wherein converting the requests for data further comprises translating the HTTP requests into one of Session Initiation Protocol (SIP), Wireless Application Protocol (WAP), or Short Messaging Service (SMS) requests.

15. The method according to claim 11, wherein the response is formatted in a HyperText Transfer Protocol (HTTP).

16. The method according to claim 11, wherein the response is formatted in a Real Time Streaming Protocol (RTSP).

17. The method according to claim 16, wherein the response is derived from within the mobile server.

18. The method according to claim 16, wherein the response is derived from a proximity connection to the mobile server.

19. A computer-readable medium comprising:
    instructions which are executable by a socket gateway for facilitating data transfer between network elements of a first firewall protected domain and a mobile server of a second firewall protected domain by performing steps comprising:

receiving hypertext transport protocol data requests from the network elements;

converting the data requests to a mobile services protocol type that is allowed to pass through a firewall of the second firewall protected domain;

transmitting the converted data requests to the mobile server; and receiving data from the mobile server in response to the converted data requests based on hypertext transport protocol exchanges initiated by the mobile server with the socket gateway; and relaying the received data to the network elements.

20. An apparatus comprising:

means for receiving hypertext transport protocol data requests from network elements in a first network;

means for converting the data requests to a mobile services protocol type that is allowed to pass through a firewall of a second network;

means for transmitting the converted data requests to a mobile server operating within the second network;

means for receiving data from the mobile server in response to the converted data requests based on hypertext transport protocol exchanges initiated by the mobile server through the firewall; and means for relaying the received data to the network elements.

21. The apparatus of claim 6, wherein the hypertext transport protocol exchanges initiated by the mobile server with the socket gateway comprise:

an address request sent from the mobile server to the socket gateway to obtain an storage address of the socket gateway for caching the content response;

an address response sent from the socket gateway to the mobile server comprising the storage address; and a posting of the content response from the mobile server to the socket gateway based on the storage address.

22. A method comprising:

receiving a hypertext transport protocol data request from a network element of a first network;

converting the data request to a mobile services request that is allowed to pass through a firewall of a second network;

transmitting the converted data requests to a mobile server operating within the second network;

receiving data from the mobile server in response to the converted data requests based on hypertext transport protocol exchanges initiated by the mobile server through the firewall; and relaying the received data to the network elements.

23. The method of claim 22 wherein the hypertext transport protocol exchanges initiated by the mobile server through the firewall comprise:

an address request received from the mobile server to obtain an storage address of the socket gateway for caching the received data;

an address response sent to the mobile server comprising the storage address; and a posting of the received data from the mobile server based on the storage address and resulting in the caching of the received data.

* * * * *